US012609453B2

(12) United States Patent
Svensson et al.

(10) Patent No.: US 12,609,453 B2
(45) Date of Patent: Apr. 21, 2026

(54) ANTENNA ARRANGEMENT

(71) Applicant: SAAB AB, Linköping (SE)

(72) Inventors: Bengt Svensson, Mölndal (SE); Anders Höök, Hindås (SE); Ville Viikari, Espoo (FI); Juha Ala-Laurinaho, Espoo (FI); Mikko Leino, Espoo (FI)

(73) Assignee: SAAB AB, Linköping (SE)

( * ) Notice: Subject to any disclaimer, the term of this patent is extended or adjusted under 35 U.S.C. 154(b) by 163 days.

(21) Appl. No.: 18/253,807

(22) PCT Filed: Nov. 23, 2021

(86) PCT No.: PCT/SE2021/051167

§ 371 (c)(1),
(2) Date: May 22, 2023

(87) PCT Pub. No.: WO2022/115022

PCT Pub. Date: Jun. 2, 2022

(65) Prior Publication Data

US 2024/0006772 A1 Jan. 4, 2024

(30) Foreign Application Priority Data

Nov. 25, 2020 (FI) ...................................... 20206203

(51) Int. Cl.
*H01Q 9/16* (2006.01)
*H01Q 5/40* (2015.01)

(52) U.S. Cl.
CPC ................. *H01Q 9/16* (2013.01); *H01Q 5/40* (2015.01)

(58) Field of Classification Search
CPC ............ H01Q 9/16; H01Q 5/40; H01Q 1/521; H01Q 5/15; H01Q 21/10; H01Q 21/28; H01Q 5/30
See application file for complete search history.

(56) References Cited

U.S. PATENT DOCUMENTS

2013/0249753 A1* 9/2013 Asanuma ................ H01Q 9/28 343/749
2016/0365645 A1 12/2016 Bisiules
(Continued)

FOREIGN PATENT DOCUMENTS

CN 203260723 U 10/2013
CN 108539375 A 9/2018
(Continued)

OTHER PUBLICATIONS

International Search Report and Written Opinion mailed Mar. 9, 2022 for International Application No. PCT/SE2021/051167, 14 pages.
(Continued)

*Primary Examiner* — Dieu Hien T Duong
(74) *Attorney, Agent, or Firm* — Sage Patent Group

(57) ABSTRACT

The present disclosure relates to an antenna arrangement including a first antenna configured to operate within a first frequency band and a second antenna configured to operate within a second frequency band. The first frequency band is higher than the second frequency band. Further, the second antenna is at least partly arranged within an illumination-field of the first antenna. Furthermore, the second antenna includes a dipole structure segmented into a plurality of electrically conductive sections, wherein each electrically conductive section is coupled to an adjacent electrically conductive section by a reactive load section.

15 Claims, 11 Drawing Sheets

(56) References Cited

U.S. PATENT DOCUMENTS

| | | | | |
|---|---|---|---|---|
| 2017/0310009 | A1* | 10/2017 | Isik | H01Q 19/108 |
| 2019/0115953 | A1 | 4/2019 | Kato | |

FOREIGN PATENT DOCUMENTS

| | | | |
|---|---|---|---|
| DE | 0570863 | A2 * | 11/1993 |
| WO | 2020/091897 | A1 | 5/2020 |
| WO | 2020/191605 | A1 | 10/2020 |

OTHER PUBLICATIONS

Office Action and Search Report mailed Jul. 22, 2021 for Finnish Application No. 20206203, 2 pages.
International Preliminary Report on Patentability mailed Feb. 24, 2023 for International Application No. PCT/SE2021/051167, 9 pages.
Office Action mailed Jan. 16, 2025 for United Arab Emirates Patent Application No. P6001214/2023, 5 pages.
Notice of Preliminary Rejection mailed Sep. 26, 2025 for Korean Patent Application No. 10-2023-7021103, 12 pages (includes English translation).

* cited by examiner

ANTENNA ARRANGEMENT

CROSS-REFERENCE TO RELATED APPLICATIONS

This application is a 35 U.S.C § 371 national stage application for International Application No. PCT/SE2021/051167, entitled "ANTENNA ARRANGEMENT", filed on Nov. 23, 2021, which claims priority to Finnish Patent Application No. 20206203, filed on Nov. 25, 2020, the disclosures and contents of which are hereby incorporated by reference in their entireties.

TECHNICAL FIELD

The present disclosure relates to an antenna arrangement comprising a first antenna configured to operate within a first frequency band and a second antenna configured to operate within a second frequency band.

BACKGROUND

Radar systems are known in the art and are used to detect the range, bearing and velocity of targets in an environment and are applied in several applications such as within the aviation industry, automotive field or for telecommunication purposes.

There are different types of radar arrangements adapted to different types of applications. For instance, there are more complex types of radar arrangements that deploy a first and a second antenna working as a primary radar and a secondary antenna function. In these types of antenna arrangements, the first and the second antenna often operate at different frequency bands and are configured to different purposes.

The first antenna may for instance be used for measuring the bearing and distance of targets and the second antenna may be utilized for target identification as a part of an IFF/SSR system. The second antenna (sometimes operating at a lower frequency band than the first antenna) is conventionally placed in front of the first antenna. It is desired to co-locate the antennas in this manner to optimize areas where the antennas are located, e.g., to minimize the overall size of the two antennas or to fit a radar system, together with an IFF/SSR-system, on a vehicle platform. In other words, it would beneficial to have the ability to co-locate antennas e.g. for compactness.

A problem with this arrangement of the first and second antenna is that the second antenna can disturb the operation and/or the performance of the first antenna. Thus, hampering the performance of the antenna arrangement as such. When combining antennas for different frequency bands, the antenna operating in a higher frequency band is often more affected by the low-frequency antenna. Arranging a low-frequency antenna in front of a high-frequency antenna will therefore often be difficult. In case of an L-band IFF-antenna in front of an X-band radar antenna, the disturbance to the antenna pattern will often be severe especially since the requirement on the antenna sidelobe performance may be very high. The use of active electronically scanned antennas, AESAs, further enhances the requirement on the primary radar sidelobe requirements and thereby the need for low disturbance secondary antennas.

Accordingly, there is a need in the art for an antenna arrangement having a first antenna (may also be referred to as a primary antenna) and a second antenna (may also be referred to as the secondary antenna) being placed in front of the first antenna, where the second antenna's disturbance of the operation or performance of the first antenna is removed or at least mitigated. Further, there is also a need for such an antenna arrangement that is convenient and cost effective in terms of manufacturing. There is specifically a lack in the present art of how to improve co-located antennas so to be able to provide an antenna arrangement having a first and a second antenna that can operate without disturbance.

Even though some currently known solutions work well in some situations it would be desirable to provide an antenna arrangement with co-located antennas that fulfils requirements related to improving the performance of the antennas while providing an arrangement that is convenient and cheap to manufacture.

SUMMARY

It is therefore an object of the present disclosure to provide an antenna arrangement, a fixed installation and a vehicle comprising such an antenna arrangement, which mitigate, alleviate or eliminate one or more of the deficiencies and disadvantages of currently known solutions.

This object is achieved by means of an antenna arrangement, a fixed installation and a vehicle as defined in the appended claims.

The present disclosure is at least partly based on the insight that in situations where an antenna arrangement has antennas that are co-located, i.e., when a second antenna is placed in front of a first antenna, it is desirable that the second antenna is electrically invisible or transparent to the first antenna. In other words, the antenna arrangement may achieve an improved performance if the first antenna can operate without any disturbance from the second antenna. In more detail, the present inventors realized that by realizing the second antenna as a "chopped dipole", where the second antenna is a dipole "chopped" into electrically small pieces with reactive loading between the pieces, the second antenna can effectively be realized to maximize power transfer past the second antenna at the operating frequency of the first antenna while maintaining operational capability at its own operating frequency band.

In accordance with an aspect of the disclosure there is provided an antenna arrangement comprising a first antenna configured to operate within a first frequency band, a second antenna configured to operate within a second frequency band, wherein the first frequency band is higher than the second frequency band. The second antenna is at least partly arranged within an illumination-field of the first antenna and the second antenna comprises a dipole structure segmented into a plurality of electrically conductive sections, wherein each electrically conductive section is coupled to an adjacent electrically conductive section by a reactive load section.

A benefit of the present disclosure is that the segmented dipole structure having electrically conductive sections allow the second antenna to be "invisible" from the view of the first antenna. In other words, the operation of the first antenna is not disturbed or hampered by having the second antenna arranged within an illumination-field of the first antenna. Thus, this allows to beneficially arrange a first and a second co-located antenna. Further, the second antenna is a dipole structure segmented into a plurality of electrically conductive sections. In other words, it utilizes a chopped dipole which may be provided by a convenient and cost-efficient standard manufacturing routine. Furthermore, the segmented structure of the second antenna does not disturb its radiation properties allowing it work properly as an antenna while being "invisible" in view of the first antenna (i.e. invisible within the frequency band of the first antenna).

The term "at least partly arranged within an illumination-field of the first antenna" may be construed as that the second antenna is at least partly arranged within a main-lobe of the first antennas radiation pattern. Alternatively, the term "at least partly arranged within an illumination-field of the first antenna" may be construed as that the second antenna is at least partly arranged in a volume defined by the first antenna's (far-field) radiation pattern.

The lowest frequency of the first frequency band may be at least two times greater than the highest frequency of the second frequency band. The first antenna may be configured to operate at a frequency band in the range of 7-11 GHz and the second antenna may be configured to operate at a frequency band in the range of 1-2 GHz. The phrase "wherein the first frequency band is higher than the second frequency band" may be construed as that the first frequency band covers a range of frequencies, each of which, is higher than any frequency in the second frequency band. Thus, in some embodiments, the first frequency band and the second frequency band are non-overlapping.

Each reactive load section may be an inductive load section. The inductive loading between electrically conductive sections provides the benefit of minimizing scattering currents.

The inductive load section may comprise at least one of a meandering line, a planar spiral coil inductor, and a lumped inductive circuit. A benefit of utilizing these types of devices is that they provide required inductances. Further, specifically a meandering line and a planar spiral coil are beneficial since they can be etched on a substrate simultaneously with the segmented structures, so it is a simple manufacturing step if the inductance needs to be varied.

The meandering line, the planar spiral coil inductor and lumped inductive circuit may be coupled to end-portions of adjacent electrically conductive sections. In other words, the inductance device connects each of the segmented structures.

The meandering line may comprise at least a first and a second turn-portion. According to some embodiments, the meandering line further comprises a third, and a fourth turn-portion. However, the meandering line may also comprise a fifth and a sixth turn-portion.

The meandering line extends in a zigzag form, a square-waveform, a sinusoidal-waveform or a saw-tooth form in-between adjacent dipole sections. These kinds of forms allow the meandering line to have a space-efficient structure while having a certain length. Thus, allowing the second antenna to meet the size requirements.

Each electrically conductive section may have a length being equal to or less than a wavelength/3 (λ/3) at a highest frequency of the first frequency band. Moreover, a spacing between adjacent electrically conductive sections may be at least a wavelength/30 (λ/30) at a highest frequency of the first frequency band.

The second antenna may be formed on a block or sheet of dielectric. The block/sheet of dielectric may be a printed circuit board (PCB) or any other suitable substrate.

The antenna arrangement may be a radar antenna arrangement, the first antenna being a first radar antenna and the second antenna being an Identification Friend or Foe (IFF) antenna or a Secondary Surveillance Radar (SSR) antenna. Thus, the second antenna may be able to characterize objects that are located by the first antenna.

The antenna arrangement may be a base station antenna arrangement comprising two different frequency bands.

The dipole structure may be a half-wavelength dipole structure at the second frequency band. Further, the first antenna and the second antenna may according to some embodiments have the same polarization.

There is further provided a fixed installation comprising the antenna arrangement as disclosed herein. The fixed installation may be a base station.

There is further provided a vehicle comprising the antenna arrangement as disclosed herein, the vehicle may be a ground vehicle, an airborne vehicle or a ship.

BRIEF DESCRIPTION OF THE DRAWINGS

In the following, the disclosure will be described in a non-limiting way and in more detail with reference to exemplary embodiments illustrated in the enclosed drawings, in which.

DETAILED DESCRIPTION

Figure 1:
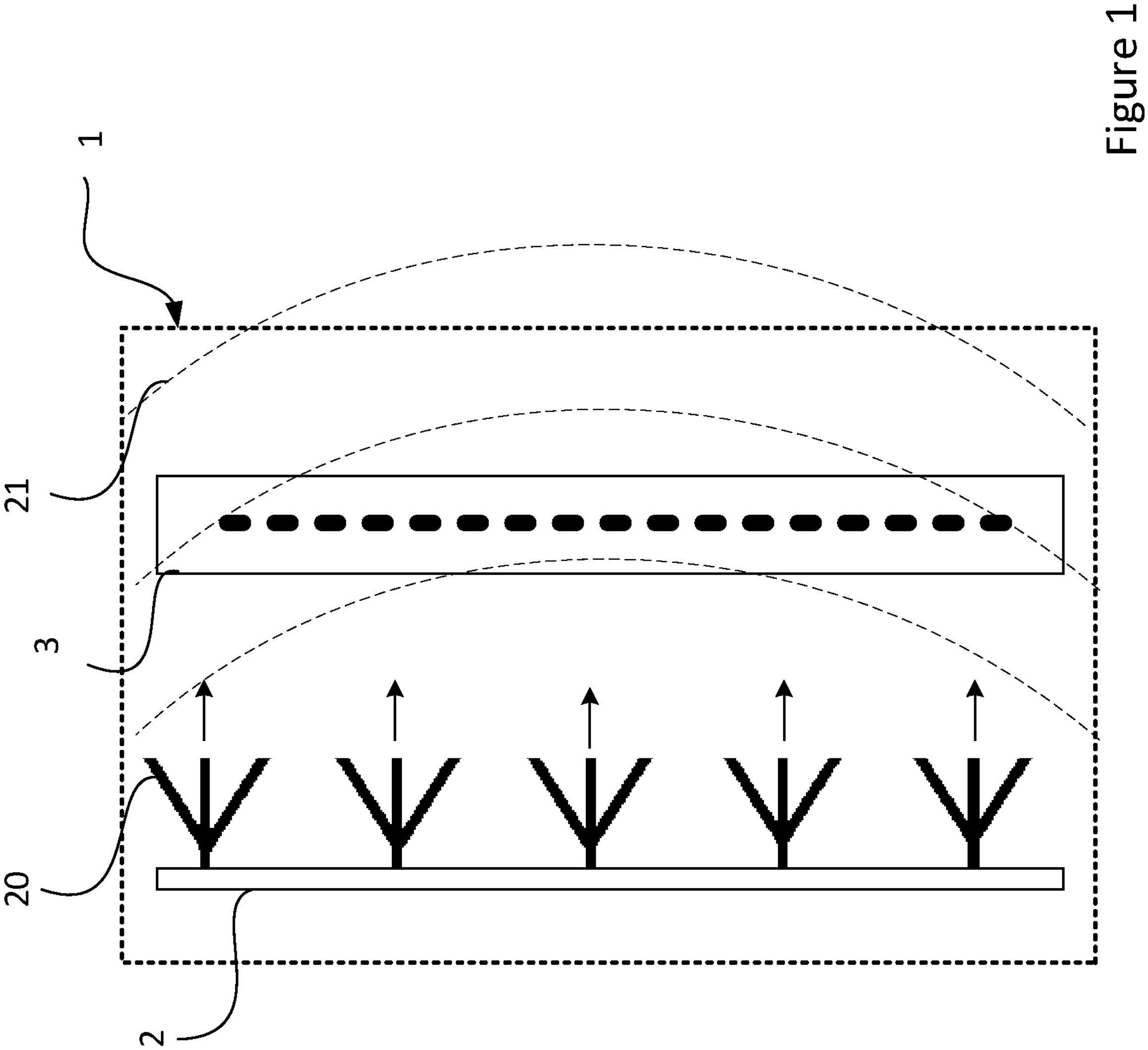
FIG. 1 illustrates an antenna arrangement comprising a first and a second antenna, where the second antenna is in an illumination view of the first antenna

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided disclosure, it will be apparent to one skilled in the art that the embodiments in the present disclosure may be realized without these details. In other instances, well known constructions or functions are not described in detail, so as not to obscure the present disclosure.

In the following description of example embodiments, the same reference numerals denote the same or similar components.

FIG. 1 discloses an antenna arrangement 1 comprising a first antenna 2 configured to operate within a first frequency band and a second antenna 3 configured to operate within a second frequency band, wherein the first frequency band is higher than the second frequency band.

As seen in FIG. 1 the second antenna 3 is at least partly arranged within an illumination-field of the first antenna 2. FIG. 1 shows that the first antenna 2 may be an antenna array comprising a plurality of antenna elements 20. The first antenna 2 may be a directional antenna. The radiation 21 from the first antenna traverses the second antenna 3. The arrangement 1 of the first and the second antenna as seen in FIG. 1 allows for a compact arrangement that can be mounted to a fixed installation or a vehicle in a space efficient manner. The first and the second antenna 2, 3 are arranged such that the second antenna 3 is in front of the first antenna 2. The first and the second antenna 2, 3 may be part of two different structures arranged together or may be part of a common structure.

Furthermore, the first antenna 2 and the second antenna 3 may have the same polarization. Thus, according to some embodiments the first antenna 2 is linearly polarized and the second antenna 3 is also linearly polarized. However, according to some embodiments the first and the second antennas 2, 3 are circularly polarized. However, it should be noted that the first and the second antenna may have any suitable polarization. In reference to the circular polarization, the second antenna may accordingly be in the form of two orthogonal "chopped dipoles" with a 90° hybrid feed.

The antenna arrangement 1 as shown in FIG. 1 may be a radar antenna arrangement. Further, the first antenna 2 may be a first radar antenna and the second antenna 3 may be an Identification Friend or Foe, IFF antenna or a Secondary Surveillance Radar, SSR, antenna. Accordingly, the antenna arrangement 1 according to the present disclosure may be utilized for detecting, identifying and characterizing objects.

Figure 2:
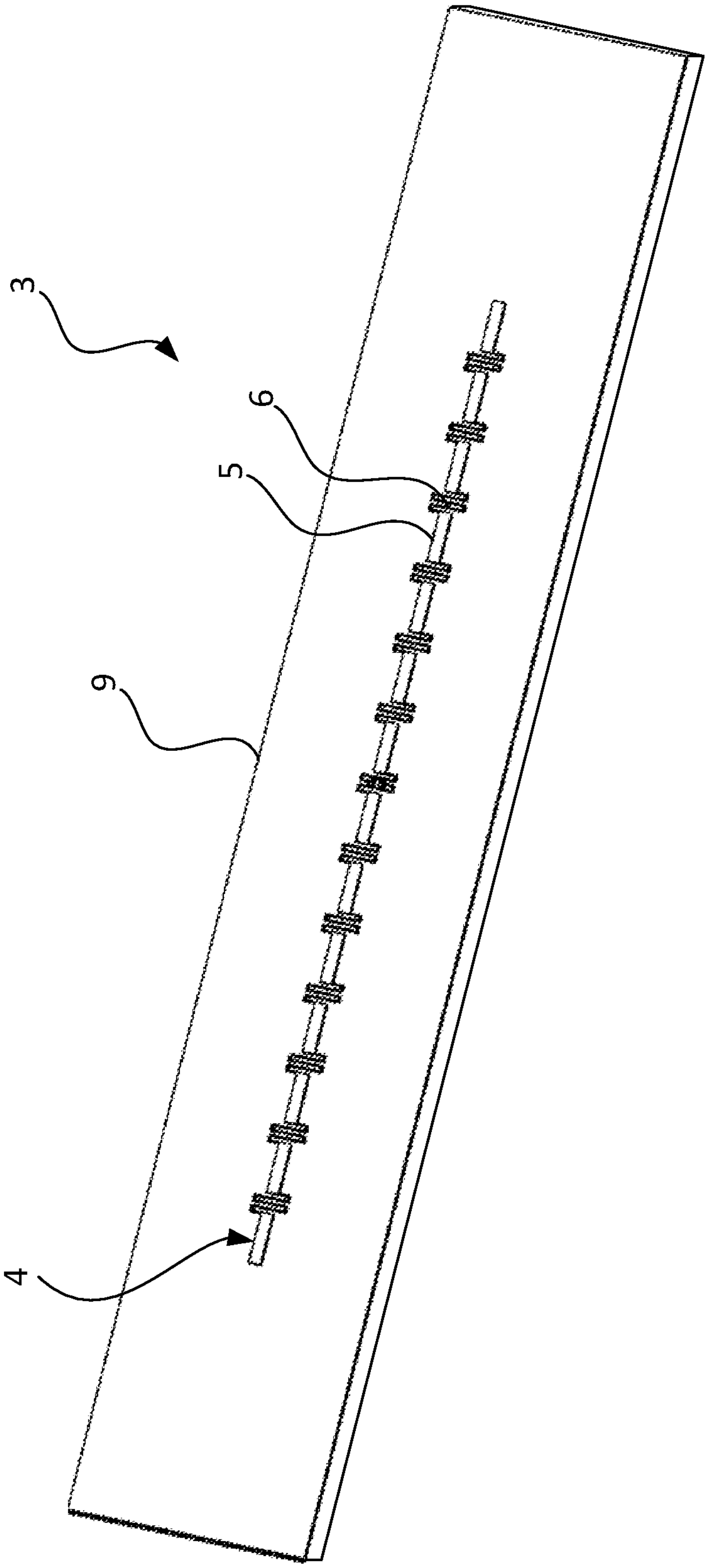
FIG. 2 illustrates an objective view of the second antenna in accordance with an embodiment of the present disclosure

FIG. 2 discloses an objective view of the second antenna 3 comprising a dipole structure 4 segmented into a plurality of electrically conductive sections 5 formed on a block or sheet of dielectric 9, wherein each electrically conductive section 5 is coupled to an adjacent electrically conductive section 5 by a reactive load section 6. The second antenna 3 may be formed on any suitable substrate. The dipole structure 4 may be a half-wavelength dipole structure.

The first frequency band is higher than the second frequency band. In more detail, in accordance with some embodiments, the lowest frequency of the first frequency band is at least two times greater than the highest frequency of the second frequency band. According to some embodiments, the first frequency band may be an X-band range i.e. 7-11.2 GHz, wherein the second frequency band may be an L-band range i.e. 1-2 GHz. The second antenna 3 as disclosed in FIG. 2 allows for it to be at least partly "invisible" in the frequency ranges of the first antenna 2. Accordingly, if the first antenna 2 operates in X-band and the second antenna 3 operates at L-band, the second antenna 3 is at least partly invisible in a frequency of e.g. 10 GHz. The term "invisible" refers to that the second antenna 3 doesn't disturb, or minimally disturbs, the operation of the first antenna 2, i.e. the power transfer is maximized past the second antenna 3 at the frequency band of the first antenna 2.

The second antenna 3 as seen in FIG. 2 may be formed on a block/sheet of dielectric 9 such as a printed circuit board. The segmented structure may be a chopped dipole, thus according to some embodiments, there may be a dipole structure 4 having a specific length which is then chopped/segmented into equally long pieces. The electrically conductive sections 5 may be arranged in a linear row as is seen in FIG. 2.

It should be noted that, with the segmented structure of the second antenna 3 making it "invisible", does not, at least substantially, hamper the performance of the second antenna 3. Thus, it still performs according to its requirements (this is further elaborated upon in FIG. 9). In other words, the second antenna 3 remains operational within its frequency band while being electrically "invisible" to the first antenna 2.

Each reactive load section 6 may be an inductive load section. Inductive loading between the segmented dipole structure 4 allows for minimizing any scattering currents.

The inductive load section 6 may comprise at least one of a meandering line 6', a planar spiral coil inductor, and a lumped inductive circuit.

Figure 3A:
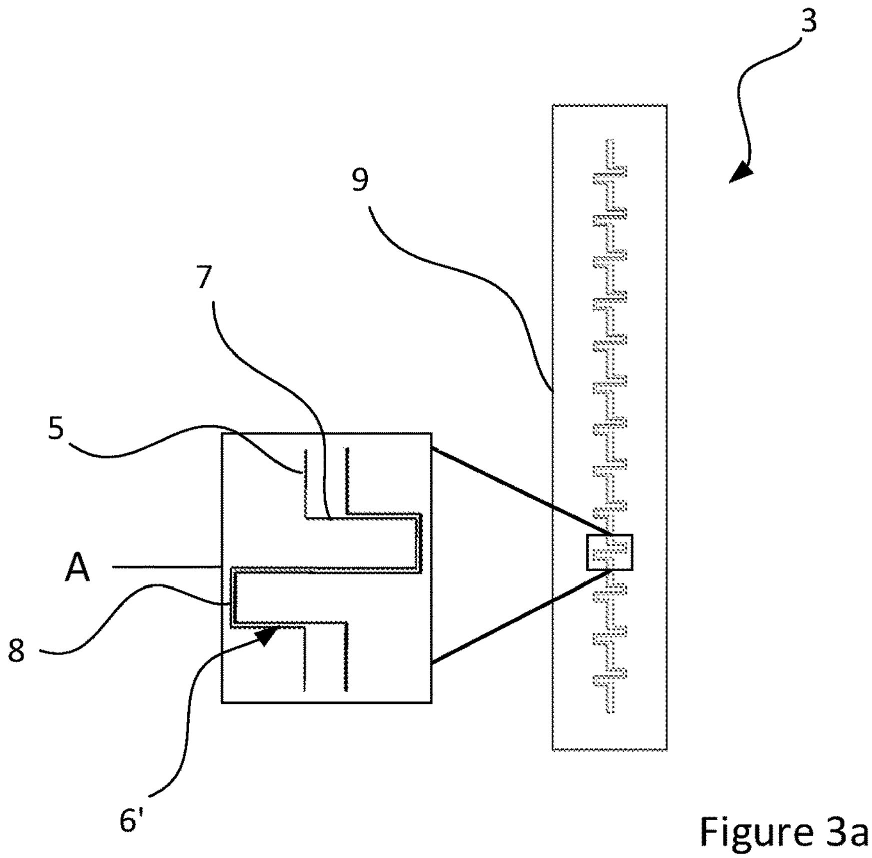
FIG. 3*a* illustrates a front view of the second antenna with a detailed view A of a reactive load section of the antenna in accordance with an embodiment of the present disclosure
Figure 3B:
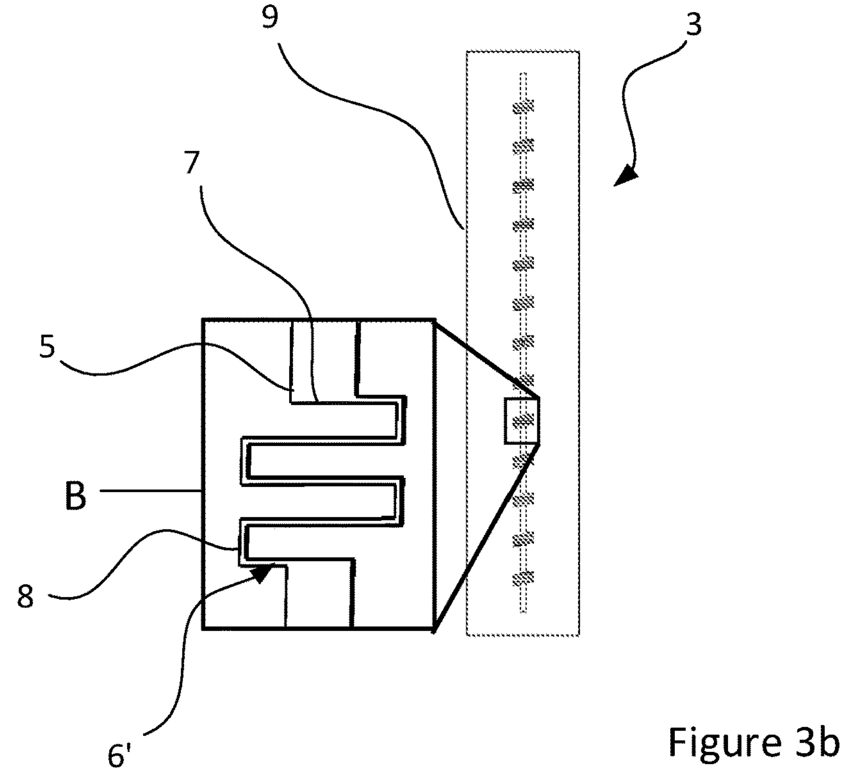
FIG. 3*b* illustrates a front view of the second antenna with a detailed view B of a reactive load section of the antenna in accordance with an embodiment of the present disclosure

FIG. 3*a* and FIG. 3*b* each show inductive load sections 6 in the form of meandering lines 6'. It is seen in the FIGS. 3*a*-3*b* that the meandering lines 6' are coupled to end-portions 7 of adjacent electrically conductive sections 5, in other words, the meandering lines 6' interconnect the adjacent electrically conductive sections 5. In FIGS. 3*a* and 3*b* there are also seen detailed views of the meandering lines 6', the detailed views are denoted A and B, respectively.

In FIG. 3*a*, the inductive load section 6 comprises a meandering line 6', wherein the meandering line 6' comprises a first and a second turn-portion 8. The turn-portions 8 are defined by the oscillation of the meandering line as seen in FIG. 3*a*, thus, one oscillation defines two turn-portions 8 in FIG. 3*a*.

However, as shown in FIG. 3*b*, the inductive load section 6 may, however, comprise a meandering line, wherein the meandering line further comprises a third, and a fourth turn-portion. Thus, the meandering line of FIG. 3*b* has two oscillations.

The inductive load section 6 may comprise any suitable amount of turn-portions 8.

Figure 3C:
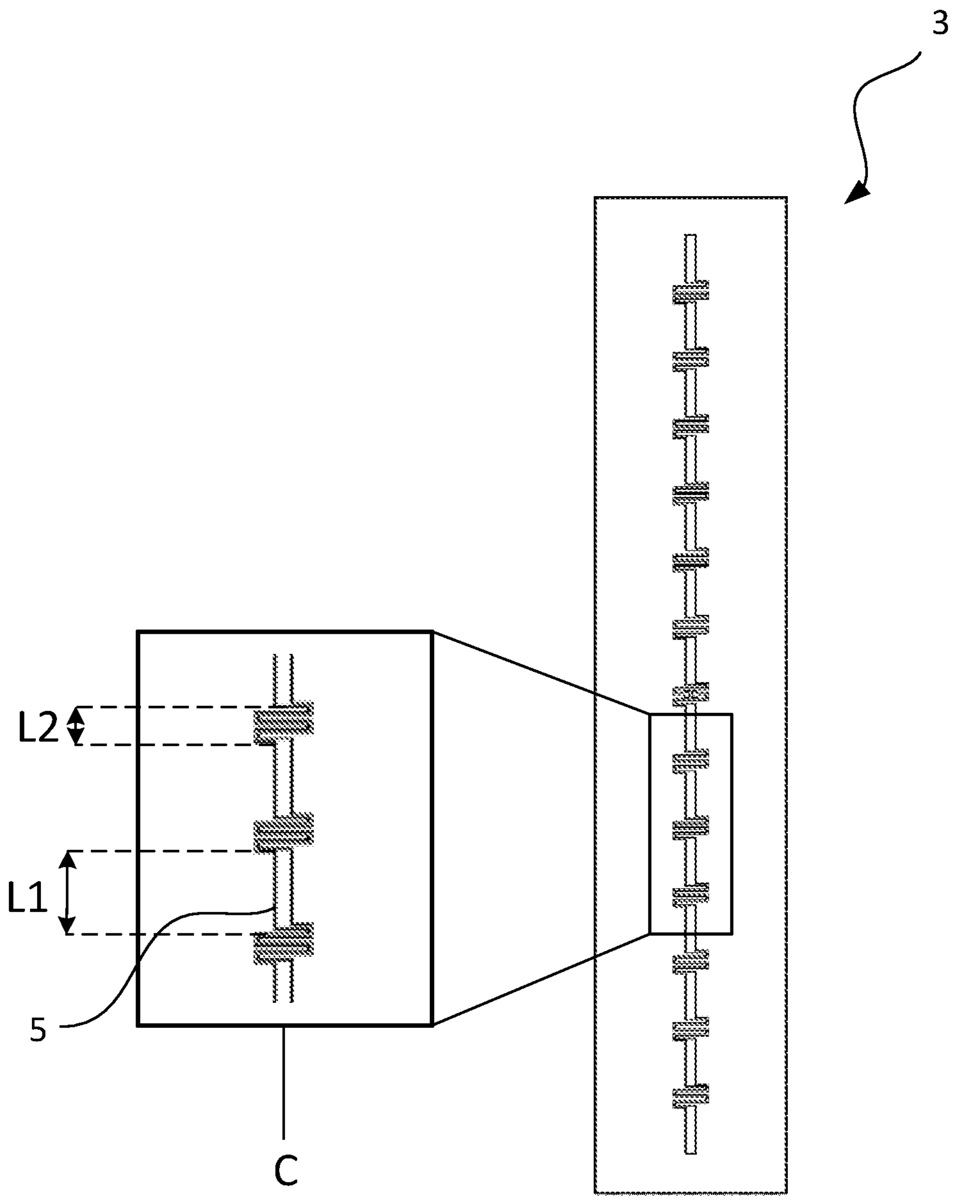
FIG. 3*c* illustrates a front view of the second antenna with a detailed view C of electrically conductive sections and reactive load sections of the antenna in accordance with an embodiment of the present disclosure

FIG. 3*c* shows the second antenna 3 in accordance with an embodiment of the present disclosure. In FIG. 3*c* there is a detailed view C of the second antenna 3, showing an electrically conductive section 5 having a length L1. The length L1 may be equal to or less than a wavelength/3, $\lambda/3$ at a highest frequency of the first frequency band.

Further, a spacing L2 between the electrically conductive sections 5 may be at least a wavelength/30, $\lambda/30$. Moreover, in some embodiments, the spacing L2 is equal to or less than a wavelength/3, $\lambda/3$ at a highest frequency of the first frequency band. The spacing L2 between the electrically conductive sections may be less than the lengths L1 of the electrically conductive sections. The length L1 of the electrically conductive sections are preferably the same for all of the segments 5, and the gaps L2 are also preferably equal.

Figure 4:
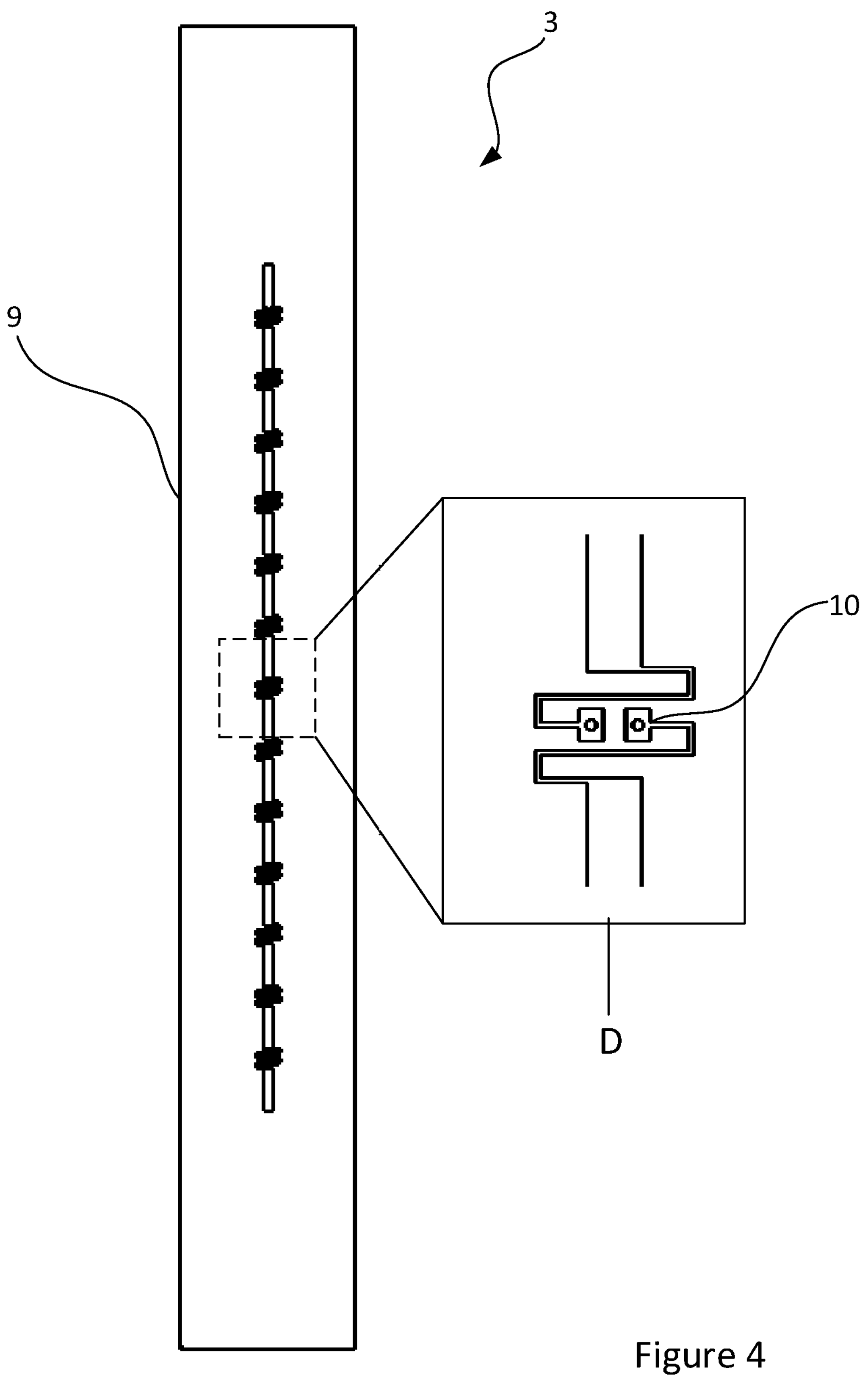
FIG. 4 illustrates a front view of the second antenna with a detailed view D of a feeding portion of the antenna in accordance with an embodiment of the present disclosure

FIG. 4 illustrates a front view of the second antenna 3 from a front view, with a detailed view D of a feeding portion 10 of the second antenna 3. The feeding portion 10 may be fed from a layer below the substrate 9 such as the opposing layer of the substrate 9.

Figure 5:
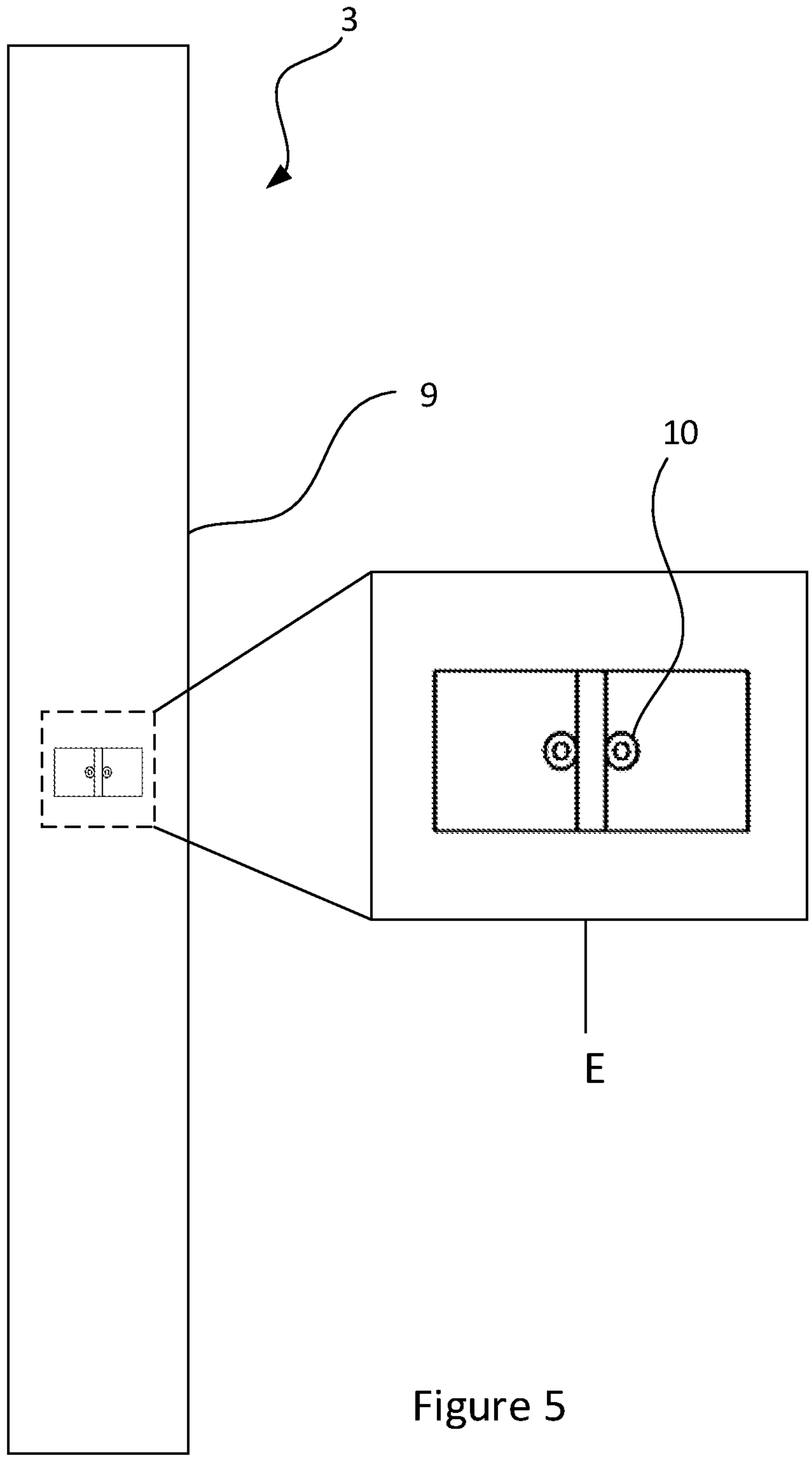
FIG. 5 illustrates a back view of the second antenna with a detailed view E of a feeding portion of the antenna in accordance with an embodiment of the present disclosure FIG. 6 schematically illustrates an antenna arrangement in accordance with an embodiment of the present disclosure

FIG. 5 illustrates a back view of the substrate 9 with a detailed view E. FIG. 5 shows the feeding portion 10 of the second antenna 3 from a back view.

Figure 6:
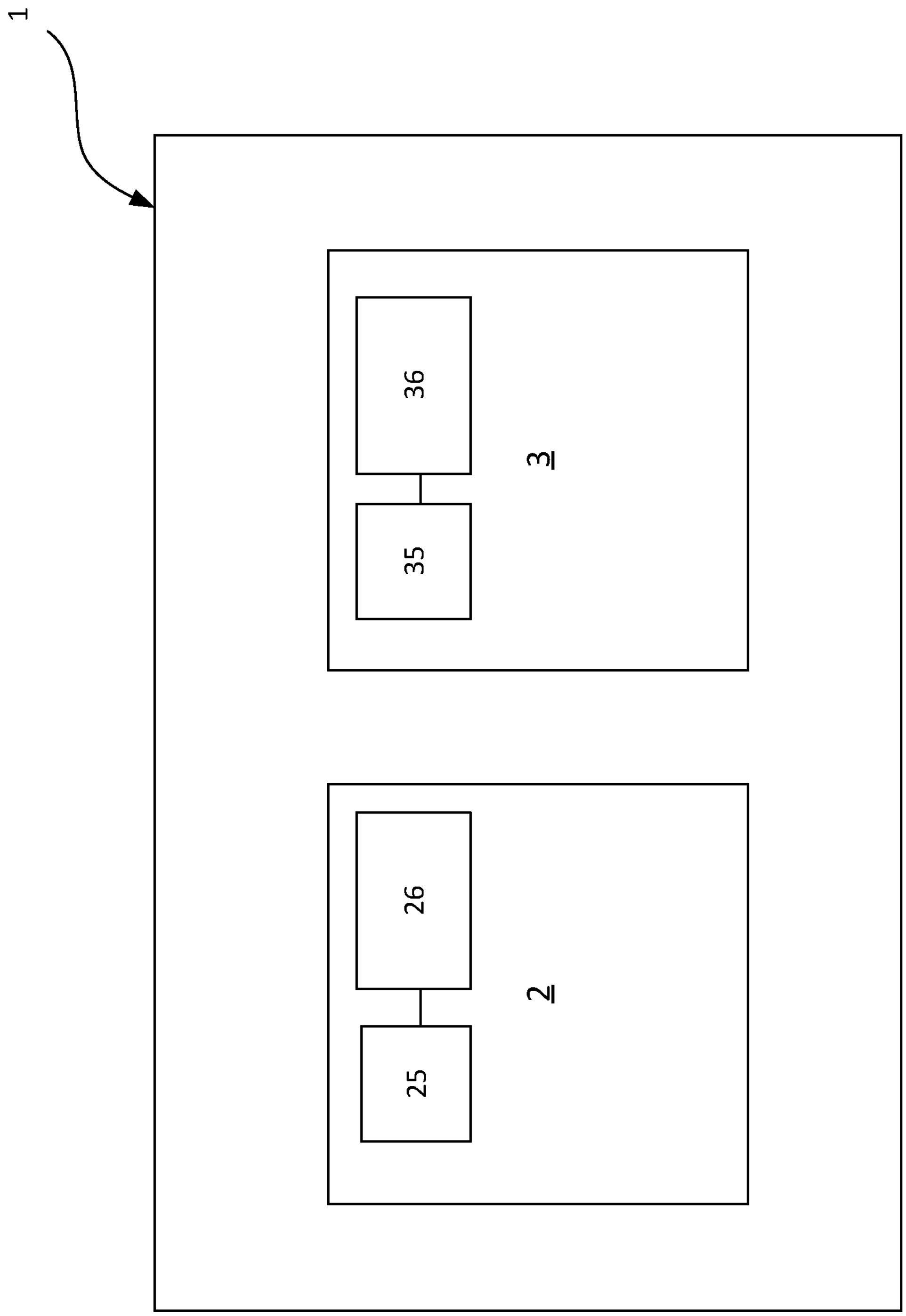

FIG. 6 schematically illustrates the antenna arrangement 1 according to the present disclosure. As shown in FIG. 5, each of the first and the second antenna 2, 3 may comprise one or more memory devices 25, 35 and control circuitry 26, 36. The memory device 25, 35 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry 26, 36. Each memory device 25, 35 may store any suitable instructions, data or information, including a computer program, software, an application including one or more of logic, rules, code, tables, etc. and/or other instructions capable of being executed by the control circuitry 26, 36 and, utilized. Memory device 25, 35 may be used to store any calculations made by control circuitry 26, 36 and/or any data received via interface. In some embodiments, each control circuitry 26, 36 and each memory device 25, 35 may be considered to be integrated Each memory device 25, 35 may also store data that can be retrieved, manipulated, created, or stored by the control circuitry 26, 36. The data may include, for instance, local updates, parameters, training data, learning models and other data. The data can be stored in one or more databases. The one or more databases can be connected to a server by a high bandwidth FAN or WAN, or can also be connected to a server through a communication network.

The control circuitry 26, 36 may include, for example, one or more central processing units (CPUs), graphics processing units (GPUs) dedicated to performing calculations, and/or other processing devices. The memory device 25, 35 can include one or more computer-readable media and can store information accessible by the control circuitry 26, 36, including instructions/programs that can be executed by the control circuitry 26, 36.

The instructions which may be executed by the control circuitry 26, 36 may comprise instructions for operating a radar system according to any aspects of the present disclosure. For example, operating the first and the second antenna 2, 3 so to detect, identify and characterize targets.

For further describing the disclosure as presented herein accompanied with further advantages thereof, a simulation of the antenna arrangement 1 in accordance with an embodiment as disclosed in FIG. 1 will be described herein. The simulations are presented in the FIGS. 7*a*-9. It should be noted that the test is based on an embodiment for a disclosing purpose, however it is not limited to said embodiment and may be varied within the present disclosure. E.g. reactive load section 6, frequency band, length of the electrically conductive section 5 and any other configuration may be varied in accordance with the present disclosure.

Figure 7A:
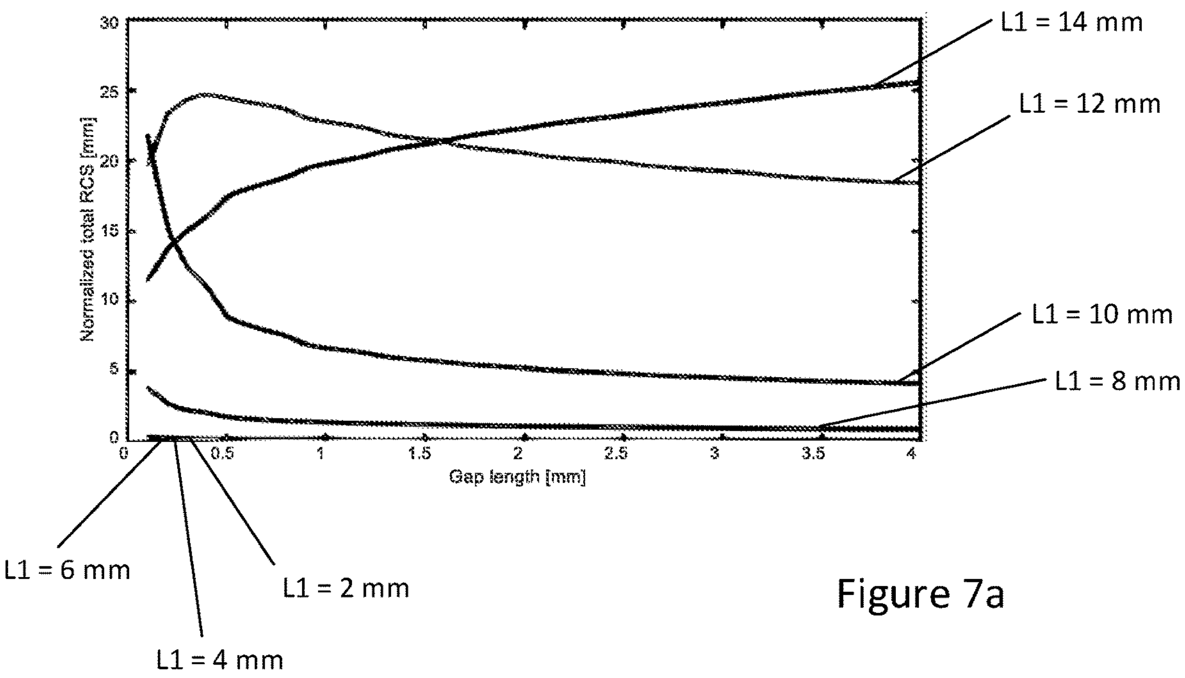
FIG. 7*a* illustrates a graph showing radar cross section values as a function of the spacing between electrically conductive sections for different lengths of each electrically conductive section
Figure 7B:
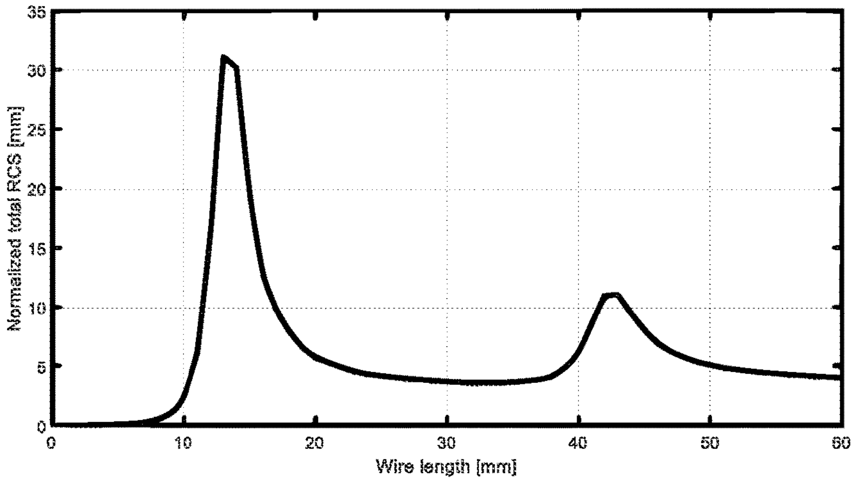
FIG. 7*b* illustrates a graph showing radar cross section values as a function of the length of each electrically conductive section.

FIGS. 7*a* and 7*b* illustrates simulation results of the antenna arrangement 1 according to an embodiment of the present disclosure. The simulation results are radar cross section (RCS) simulations at the first frequency band performed in order to test different configurations of the length L1 of each electrically conductive section 5 as well as different configurations of the spacing (i.e. the gap) L2 between in-between two adjacent electrically conductive sections (L1 and L2 are explicitly disclosed in FIG. 3*c*).

FIG. 7*a* illustrates the radar cross section (RCS) as a function of the spacing L2 (denoted gap length in the graph) between adjacent electrically conductive sections 5 where different lengths L1 of electrically conductive sections 5 are plotted (from 2-14 mm) in the graph. As seen, in the figure the lengths L1 of an electrically conductive section 5 that are 8 mm or less lead to a reduced RCS over a broad range of gap lengths as compared to the larger length L1 values.

7*b* shows the radar cross section values as a function of the length L1 of each electrically conductive section 5 (denoted wire length) in the graph, it's shown in the graph that a maximum length L1 of each electrically conductive section 5 may be less than 8 mm, so to minimize the radar cross section.

Based on the simulations seen in the FIGS. 7*a*-7*b* each electrically conductive section 5 may be designed to have a length L1 being equal to or less than λ/3 at the highest frequency of the frequency band of the first antenna. Moreover, a spacing L2 between adjacent electrically conductive sections may be at least λ/30 at the highest frequency of the frequency band of the first antenna. Thus, for a first antenna 2 having X-band frequency and a second antenna 3 having an L-band frequency the length of the electrically conductive sections L1 may be less than 8 mm.

Figure 8:
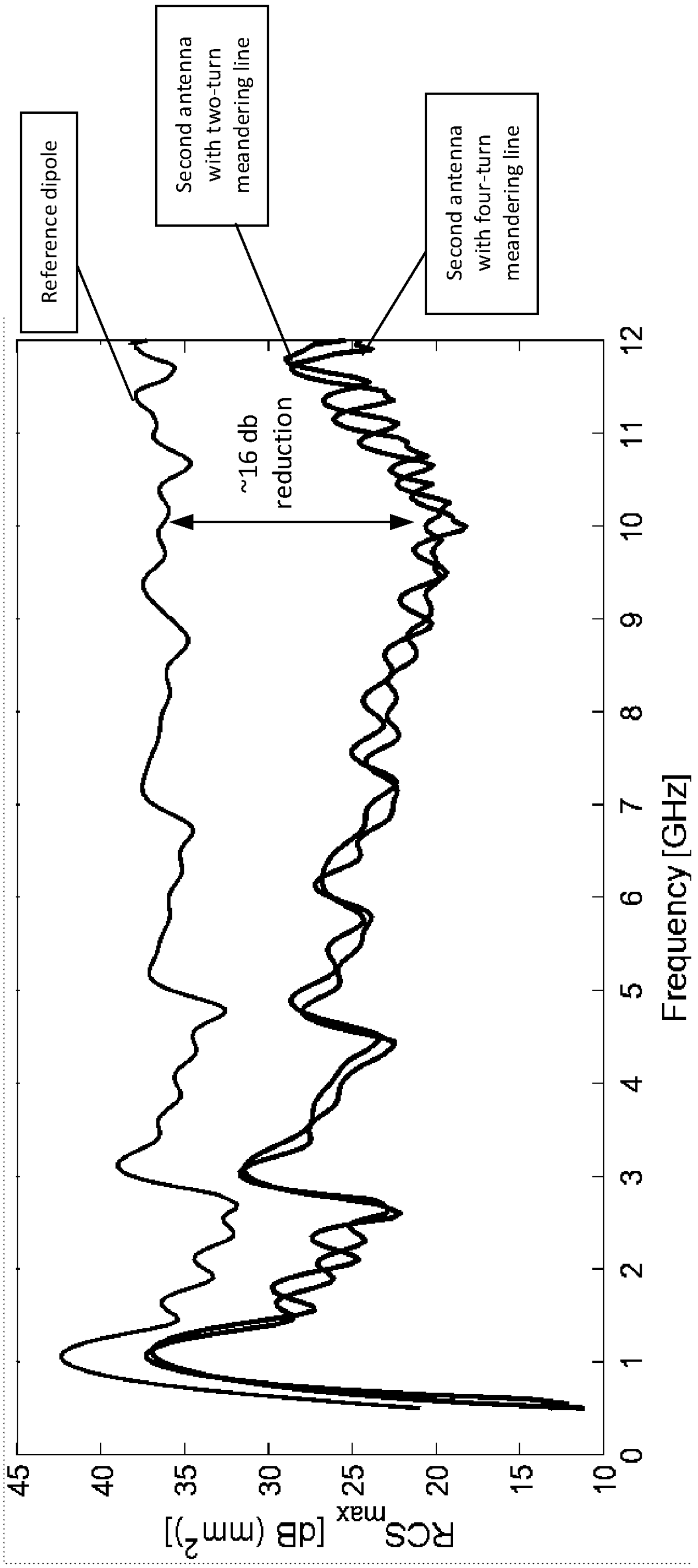
FIG. 8 illustrates a graph showing the radar cross section as a function of frequency for two embodiments of the second antenna in accordance with the present disclosure compared to a reference dipole

FIG. 8 illustrates results of a simulation of an antenna arrangement 1 in the form of a graph. The simulation is performed in an arrangement where the second antenna 3 is within an illumination field (e.g. the second antenna 3 may be arranged in front of the first antenna 2) of the first antenna 2, so that the second antenna 3 is illuminated with a plane RF wave. The simulation is performed so to evaluate the "invisibility" of the second antenna 3 relative to the first antenna 2, in other words, the simulation is performed so to evaluate whether the second antenna 3 disturbs the operation of the first antenna 2 in the antenna arrangement 1. In FIG. 8 there is illustrated a graph showing results of a simulation performed on two embodiments of the second antenna 3 operating at a frequency of 1 GHz, a first embodiment having a meandering line 6' with two turn portions 8 and a second embodiment having a meandering line 6' with four turn portions 8. Values of the radar cross section are calculated for a frequency band of 0.5-12 GHz which are shown on the x-axis on the graph. Further as a reference to the simulation of the performance of the antenna arrangement 1, the maximum radar cross section values of a conventional half wave dipole, operating at a frequency of 1 GHz is also evaluated (and disclosed in FIG. 8, denoted "reference dipole"). It should be noted that FIG. 8 is only an illustrative embodiment and the disclosure is not limited to these embodiments and may be varied at least within the scope of the disclosure herein.

FIG. 8 shows that specifically in higher frequency bands (8-12 GHz) the second antenna 3 provides for an improved "invisibility" performance compared to the reference conventional half-wave dipole antenna. At a frequency of 10 GHz there is approximately a 16 dB radar cross section reduction (this is denoted in the graph) of the two embodiments of the second antenna 3 compared to the reference dipole. Accordingly, the second antenna 3 according to the present disclosure provides for an improved "invisibility" compared to a conventional dipole. Thus, in the frequency ranges of the first antenna 2 which are higher than of the second antenna 3, the second antenna 3 according to the present disclosure provides for less disturbance of to an RF signal illuminated from behind compared to a conventional dipole structure.

Figure 9:
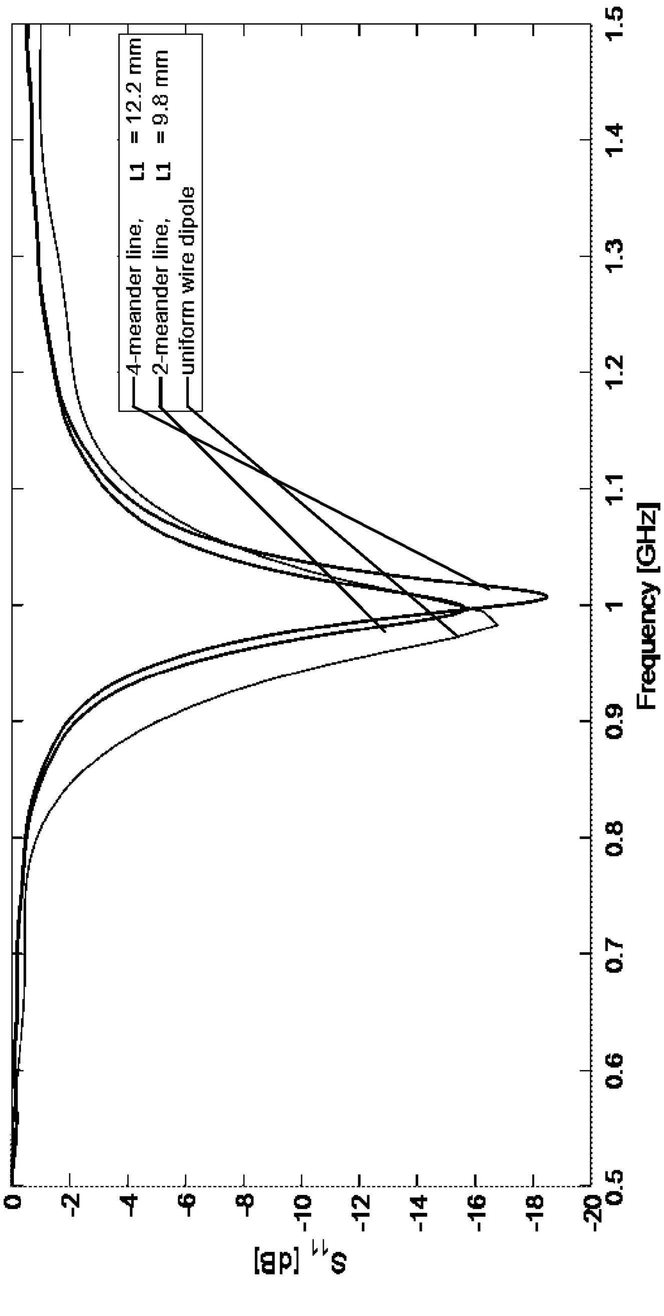
FIG. 9 illustrates a graph showing the performance of two embodiments of the second antenna in accordance with the present disclosure compared to a reference dipole FIG. 10*a* schematically illustrates a fixed installation comprising an antenna arrangement in accordance with an embodiment of the present disclosure FIG. 10*b* schematically illustrates a vehicle comprising an antenna arrangement in accordance with an embodiment of the present disclosure

FIG. 9 shows results of a simulation of the two embodiments of the second antenna 3 with differing reactive load sections 6 and the reference dipole operating at a frequency of 1 GHz. The evaluated parameter is the antenna return loss denoted by Su over frequency. The first embodiment is a second antenna 3 having a reactive load section 6 being a meandering line with 2 turn-portions and the second embodiment is a second antenna 3 having a reactive load section 6 being a meandering line with 4 turn portions. The graph shows that the three antennas perform similarly at 1 GHz. In other words, the "segmented" structure of the present disclosure provides for the same performance as a conventional dipole structure. Accordingly, FIGS. 8 and 9 show that the second antenna 3 as disclosed herein provide for a reduced disturbance towards the first antenna 2, i.e., provides a higher invisibility compared to the reference dipole, while having a similar performance with respect to reflected power compared to the reference dipole. Accordingly, the second antenna 3 as disclosed herein provides for an improved performance compared to a conventional dipole structure.

Figure 10A:
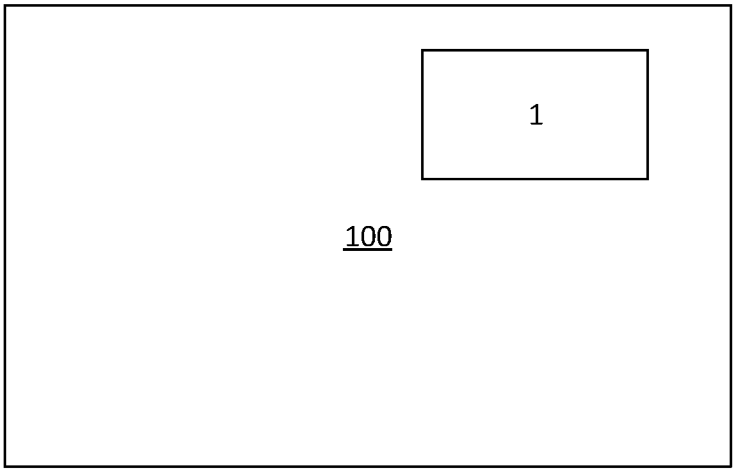

FIG. 10*a* shows a fixed installation 100 comprising the antenna arrangement 1 in accordance with an embodiment of the present disclosure. The fixed installation 100 may be a base station.

Figure 10B:
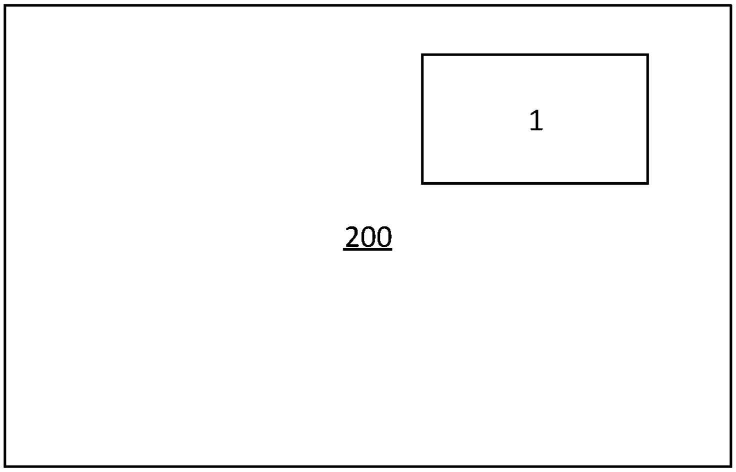

FIG. 10*b* shows a vehicle 200 comprising the antenna arrangement 1 in accordance with an embodiment of the present disclosure. The vehicle may be a ship, ground vehicle or an airborne vehicle.

The invention claimed is:

1. An antenna arrangement comprising:

a first antenna configured to operate within a first frequency band, a second antenna configured to operate within a second frequency band, wherein the first frequency band is higher than the second frequency band, wherein the second antenna is arranged in front of the first antenna such that the second antenna is within an illumination field of the first antenna and is illuminated with a plane RF wave from the first antenna, wherein the second antenna comprises a dipole structure segmented into a plurality of electrically conductive sections, wherein each electrically conductive section is coupled to an adjacent electrically conductive section by a reactive load section, wherein each electrically conductive section has a length (L1) being equal to or less than λ/3, and wherein a spacing (L2) between adjacent electrically conductive sections is at least λ/30, wherein λ is the wavelength at a highest frequency of the first frequency band;

wherein each reactive load section is an inductive load section comprising a meandering line;

wherein the meandering line comprises a first, a second, a third, and a fourth turn-portion, wherein two turn portions define an oscillation of the meandering line.

2. The antenna arrangement according to claim 1, wherein a lowest frequency of the first frequency band is at least two times greater than a highest frequency of the second frequency band.

3. The antenna arrangement according to claim 1, wherein the meandering line is coupled to end-portions of adjacent electrically conductive sections.

4. The antenna arrangement according to claim 1, wherein the meandering line extends in a zigzag form, a square-waveform, a sinusoidal-waveform or a saw-tooth form in-between adjacent dipole sections.

5. The antenna arrangement according to claim 1, wherein the second antenna is formed on a block or sheet of dielectric.

6. The antenna arrangement according to claim 1, wherein the antenna arrangement is a radar antenna arrangement, the first antenna being a first radar antenna and the second antenna being an Identification Friend or Foe (IFF) antenna or a Secondary Surveillance Radar (SSR) antenna.

7. The antenna arrangement according to claim 1, wherein the dipole structure is a half-wavelength dipole structure.

8. The antenna arrangement according to claim 1, wherein the first antenna and the second antenna have the same polarization.

9. The antenna arrangement according to claim 1, wherein the first antenna is a directional antenna.

10. The antenna arrangement of claim 1, wherein the electrically conductive sections have equal length L1, the spacings L2 between adjacent sections are equal, and L2 is less than L1.

11. The antenna arrangement of claim 10, wherein the first frequency band is X-band (7-11.2 GHZ) and the second frequency band is L-band (1-2 GHZ).

12. The antenna arrangement of claim 10, wherein each electrically conductive section has L1<8 mm.

13. The antenna arrangement of claim 1, wherein, at 10 GHz, the radar cross section of the second antenna is at least 10 dB lower than that of a conventional half-wave dipole operating at the second frequency band.

14. A fixed installation comprising an antenna arrangement, wherein the antenna arrangement comprises:

a first antenna configured to operate within a first frequency band, a second antenna configured to operate within a second frequency band, wherein the first frequency band is higher than the second frequency band, wherein the second antenna is arranged in front of the first antenna such that the second antenna is within an illumination field of the first antenna and is illuminated with a plane RF wave from the first antenna, wherein the second antenna comprises a dipole structure segmented into a plurality of electrically conductive sections, wherein each electrically conductive section is coupled to an adjacent electrically conductive section by a reactive load section, wherein each electrically conductive section has a length (L1) being equal to or less than λ/3, and wherein a spacing (L2) between adjacent electrically conductive sections is at least λ/30, wherein λ is the wavelength at a highest frequency of the first frequency band;

wherein each reactive load section is an inductive load section comprising a meandering line;

wherein the meandering line comprises a first, a second, a third, and a fourth turn-portion, wherein two turn portions define an oscillation of the meandering line.

15. A vehicle comprising an antenna arrangement, the antenna arrangement comprising: a first antenna configured to operate within a first frequency band, a second antenna configured to operate within a second frequency band, wherein the first frequency band is higher than the second frequency band, wherein the second antenna is arranged in front of the first antenna such that the second antenna is within an illumination field of the first antenna and is illuminated with a plane RF wave from the first antenna, wherein the second antenna comprises a dipole structure segmented into a plurality of electrically conductive sections, wherein each electrically conductive section is coupled to an adjacent electrically conductive section by a reactive load section, wherein each electrically conductive section has a length (L1) being equal to or less than λ/3, and wherein a spacing (L2) between adjacent electrically conductive sections is at least λ/30, wherein λ is the wavelength at a highest frequency of the first frequency band;

wherein each reactive load section is an inductive load section comprising a meandering line;

wherein the meandering line comprises at least a first a second, a third and a fourth turn-portion, wherein two turn portions define an oscillation of the meandering line.

* * * * *